Figure 5:
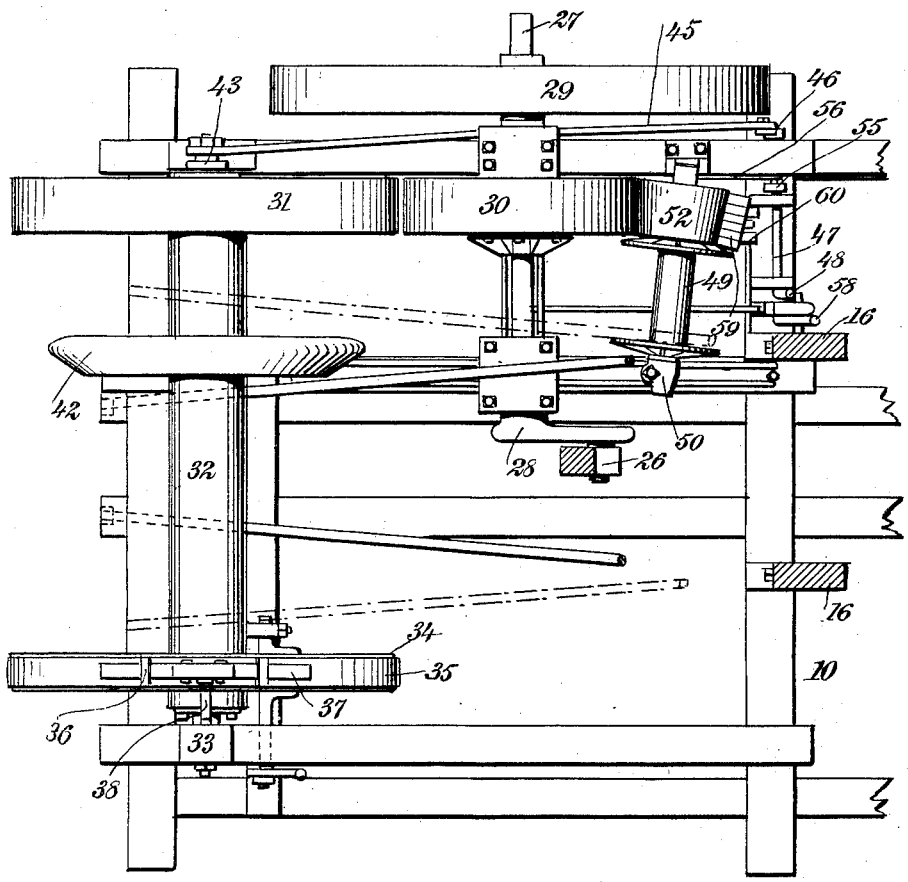

No. 737,545. PATENTED AUG. 25, 1903.
C. S. WRIGHT.
WELL DRILLING APPARATUS.
APPLICATION FILED SEPT. 17, 1902.

NO MODEL. 6 SHEETS—SHEET 1.

WITNESSES:
H. Walker
Isaac B. Owens.

INVENTOR
Clyde S. Wright
BY
[signature]
ATTORNEYS.

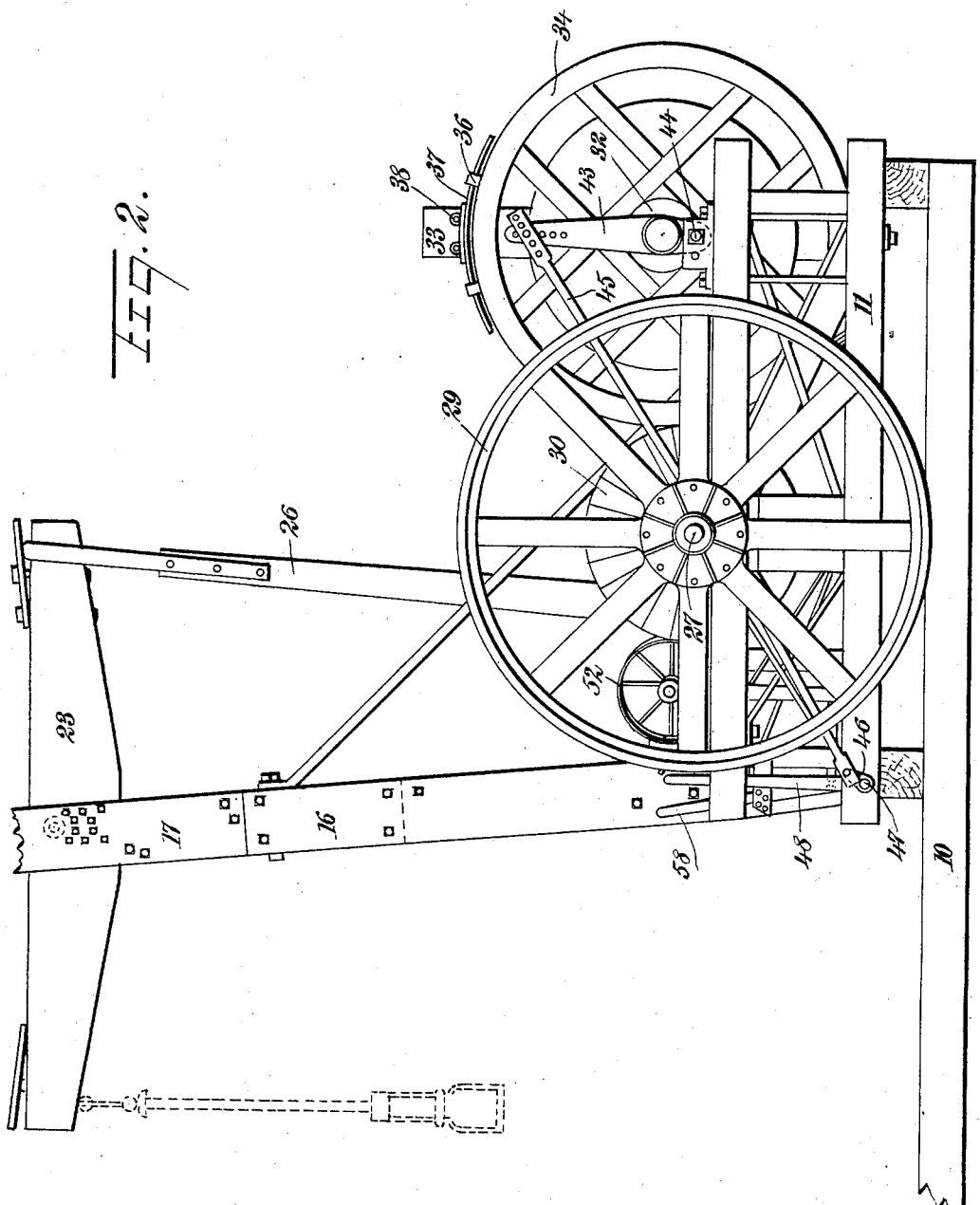

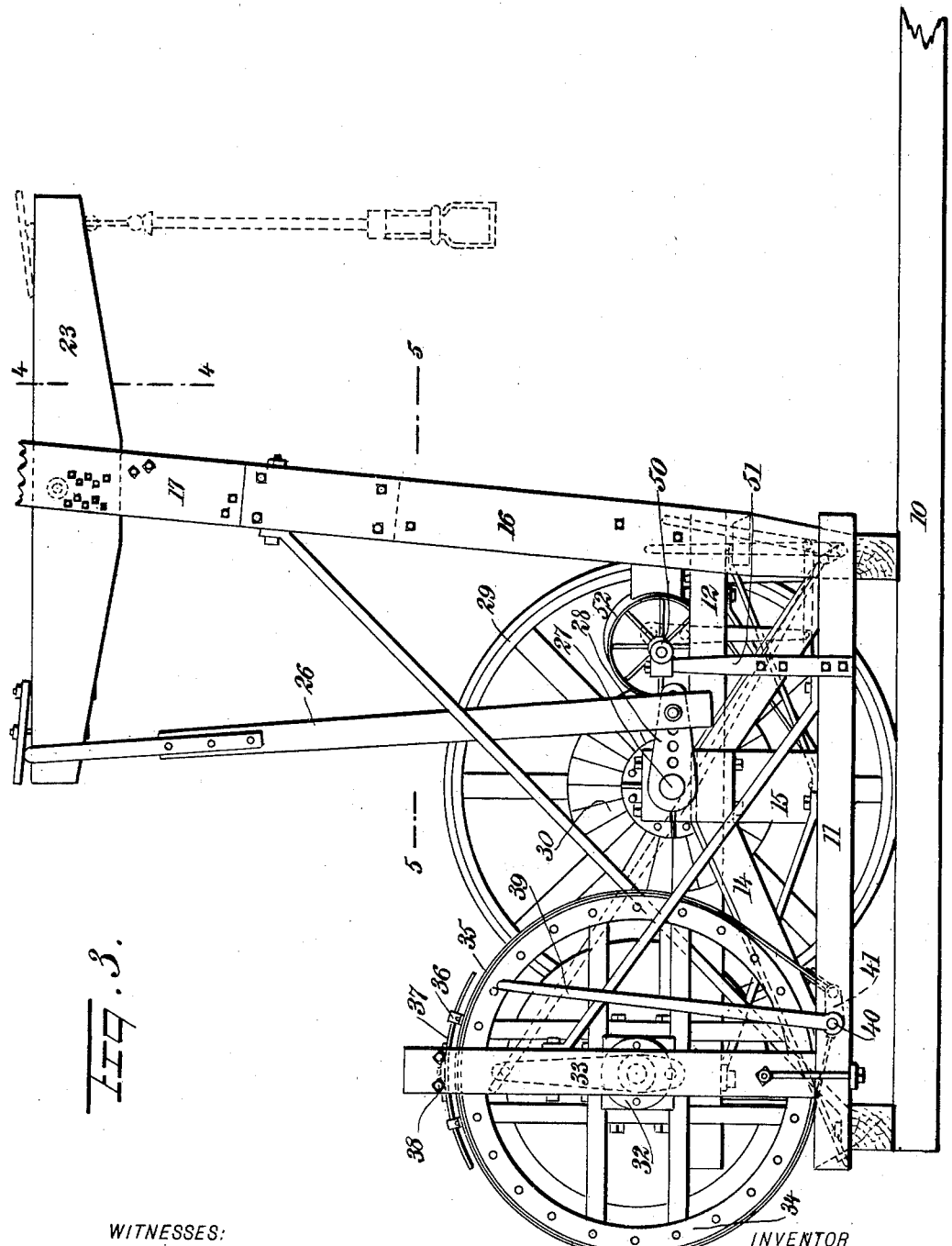

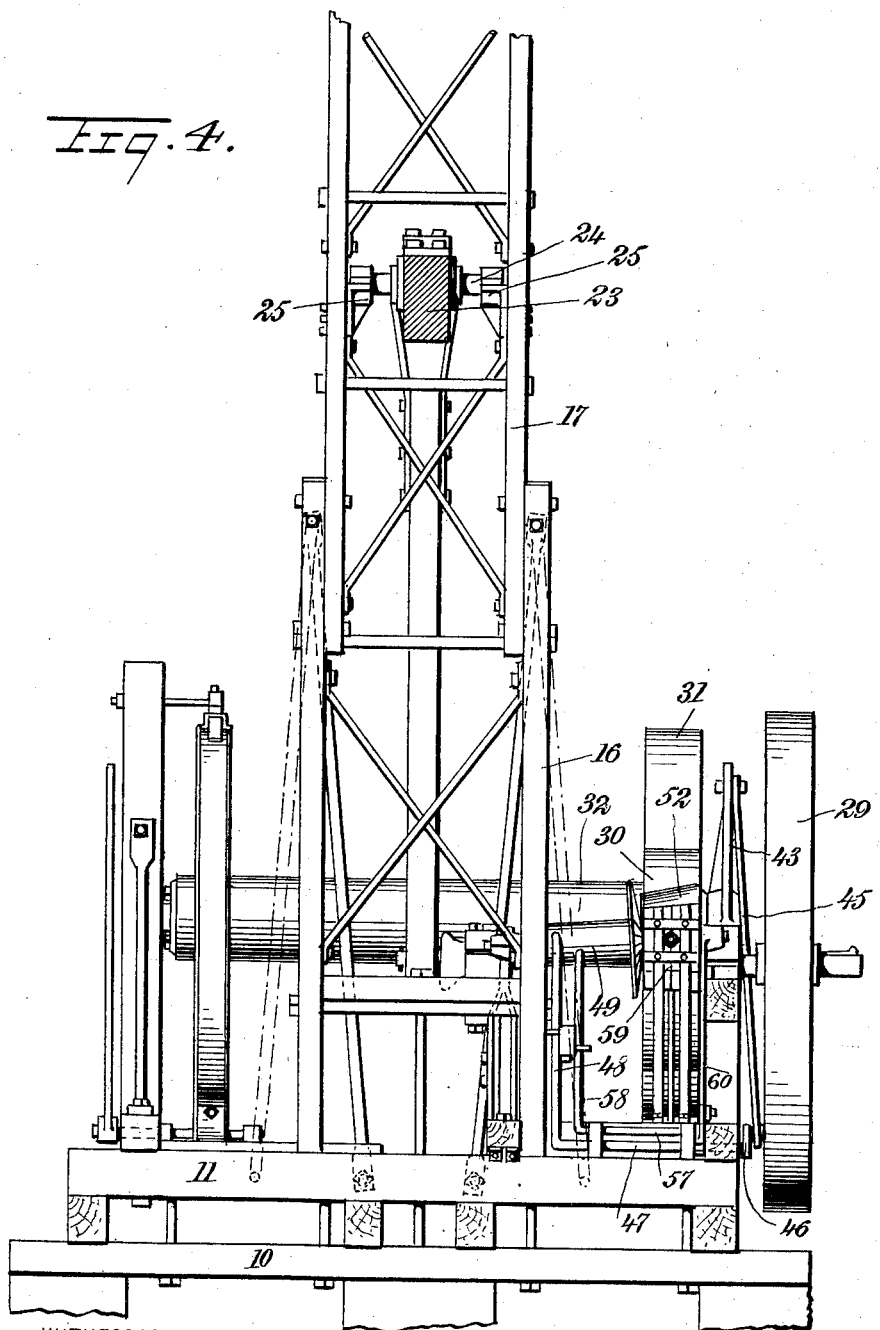

No. 737,545. PATENTED AUG. 25, 1903.
C. S. WRIGHT.
WELL DRILLING APPARATUS.
APPLICATION FILED SEPT. 17, 1902.
NO MODEL. 6 SHEETS—SHEET 5.

WITNESSES:
H. Walker
Isaac B. Owens.

INVENTOR
Clyde S. Wright
BY
ATTORNEYS.

No. 737,545. PATENTED AUG. 25, 1903.
C. S. WRIGHT.
WELL DRILLING APPARATUS.
APPLICATION FILED SEPT. 17, 1902.
NO MODEL. 6 SHEETS—SHEET 6.
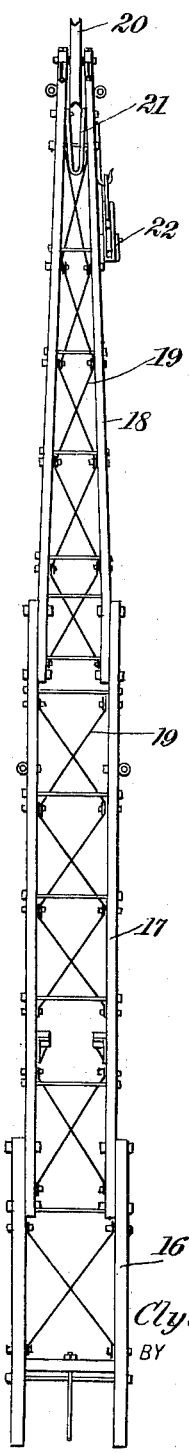
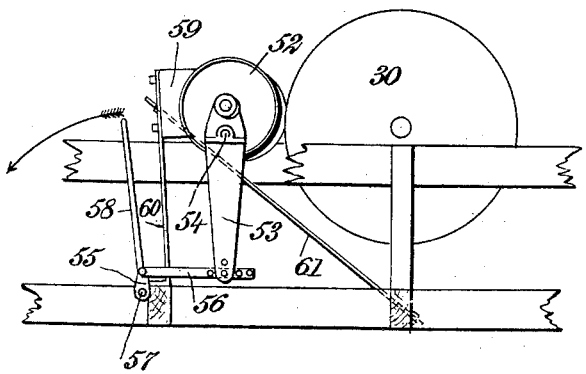
WITNESSES:
H. Walker
Isaac B. Owens.
INVENTOR
Clyde S. Wright
BY
ATTORNEYS.

No. 737,545. Patented August 25, 1903.

UNITED STATES PATENT OFFICE.

CLYDE SELWYN WRIGHT, OF QUAKER CITY, OHIO.

WELL-DRILLING APPARATUS.

SPECIFICATION forming part of Letters Patent No. 737,545, dated August 25, 1903.

Application filed September 17, 1902. Serial No. 123,736. (No model.)

*To all whom it may concern:*

Be it known that I, CLYDE SELWYN WRIGHT, a citizen of the United States, and a resident of Quaker City, in the county of Guernsey and State of Ohio, have invented a new and Improved Well-Drilling Apparatus, of which the following is a full, clear, and exact description.

This invention relates to an apparatus for drilling wells; and it lies in certain novel features of construction and arrangement concerned with the mast, the walking-beam, and the drums for operating the bull-line and sand-line.

This specification is a specific description of one form of the invention, while the claims are definitions of the actual scope thereof.

Reference is to be had to the accompanying drawings, forming a part of this specification, in which similar characters of reference indicate corresponding parts in all the figures.

Figure 1 is a side elevation of the complete apparatus, illustrating by dotted lines the manner in which the mast is raised into position. Fig. 1ᵃ is a detail view showing the strut which is employed in the operation of raising the mast. Fig. 2 is an enlarged side elevation looking toward the band-wheel. Fig. 3 is an enlarged side elevation looking toward the opposite side of the machine. Fig. 4 is a front elevation showing the walking-beam in section on the line 4 4 in Fig. 3. Fig. 5 is a plan view showing the mast and the connecting-rod of the walking-beam in section on the line 5 5 in Fig. 3. Fig. 6 is a reduced front elevation of the mast, and Fig. 7 is a detail view showing the sand-reel friction-gear.

The apparatus is mounted on a suitable base 10, and its frame comprises bottom members 11, top members 12, diagonals 14, and upright members 15, these parts being all securely bound together to form a rigid structure. The mast comprises a lower section 16, which is rigid on the frame, an intermediate section 17, and a top section 18, these sections being each constructed of parallel side bars having a "lacing" or diagonal bar-bracing 19 between them. The sections are joined together by bolts or other fastenings, as illustrated in the drawings. At the top of the mast is a sheave 20, over which runs the bull-line, and coacting with this sheave is a guide 21 for said line.

22 indicates a snatch-block, which is fastened to the side of the section 18, near the top thereof, and serves to carry the sand-line.

23 indicates the walking-beam, the trunnions 24 of which are mounted in boxes 25, fastened to the inner sides of the section 17. The outer end (right-hand end in Fig. 3) of the beam operates the drill and the inner end is connected to the pitman 26, whereby the beam is driven in the usual manner.

Suitably mounted in the frame is the drive-shaft 27, to the inner end of which is fastened a crank 28, this crank being connected with the pitman 26, so that the rotary movement of the shaft 27 drives the pitman. Said shaft carries at its outer end the band-wheel 29, and to this wheel the power for driving the machine is primarily applied.

30 indicates a friction-wheel, which is fastened on the shaft 27 and which is adapted to be engaged by the bull-wheel 31, so as to rotate the bull-drum 32, whereon said wheel is fastened. The bull-drum 32 has its right-hand end (see Fig. 3) mounted in an upright 33, rising from the frame, the arrangement being such as permits a slight lateral movement of the drum. The end of the drum adjacent to said bearing carries a brake-wheel 34, around which extends a brake-strap 35. Said strap is held at its top by means of eyes 36, fastened to the strap and engaged with a bar 37, which in turn is held by bracket-bolts 38 on the upper end of the upright 33.

39 indicates a lever, which is fastened to a shaft 40, mounted to rock in the base 11 of the frame (see Fig. 3) and which is provided with an offset U-shaped arm 41. To this arm is connected the movable end of the strap 35. The fixed end of said strap is connected to the shaft 40 adjacent to the said arm. By throwing the lever 39 to the right (see Fig. 3) the strap is tightened on the wheel, and the movement of the drum 32 may thereby be arrested.

42 represents a flange, (see Fig. 5,) which is fastened on the drum 32, and this flange, coacting with the brake-wheel 34, forms the reel or drum proper—that is to say, the bull-line is wound between these points. The opposite end of the drum 32 (see Fig. 2) is mounted in a lever 43, which is fulcrumed at the point 44 on the top of the frame and which is connected by a rod 45 with a crank 46, fastened on a shaft 47. Said shaft 47 (see Fig. 4) has an upwardly-extending arm 48, which facilitates the rocking of the shaft, and by this means the bull-wheel 31 and the drum 32 may be moved toward and from the friction-wheel 30, so as to engage said wheel with or disengage it from the friction-wheel, and by this arrangement the bull-drum is rotated.

49 indicates the sand-reel, the inner end or journal of which is mounted in a boxing 50, which in turn is arranged to swing on an upright support 51, carried by the base. (See Figs. 3 and 5.) Said reel carries at its opposite or outer end a frusto-conical friction-wheel 52, this wheel being arranged to engage the friction-wheel 30 at the side opposite the bull-wheel 31. Said opposite end of the sand-reel is mounted in a lever 53, which is fulcrumed at the point 54 and connected at its lower end with a crank 55 through the medium of a link 56. (See Fig. 7.) Said crank 55 is fastened on a rock-shaft 57, and to this rock-shaft is secured a lever 58. At the side of the friction-wheel 52 opposite the friction-wheel 30 is a brake-block 59. Said block is supported by an arm 60, rising from the lower part of the base, and the arm is braced by a diagonal rod 61. By means of the lever 58 the outer end (the end having the friction-wheel 52 attached) of the sand-reel may be moved to engage the friction-wheel 30, and thereby drive the sand-reel; or it may be moved away from this friction-wheel and engaged with the brake-block 59, thus arresting the movement of the sand-reel. The lever 58 therefore controls the driving and the braking of the sand-reel.

The use of the invention will be fully understood by persons skilled in the art, as in the manner of operation it does not differ from prior apparatus.

In the transportation of the apparatus the mast must of course be lowered, and this is facilitated by the jointed sections thereof. The dotted lines in Fig. 1 illustrate the manner of raising the mast. In this operation the two sections 17 and 18 are rigidly joined together, and the section 17 is connected to the section 16 by two transversely-alined bolts, (indicated at the point 62 in Fig. 1.) These bolts form a fulcrum around which the sections 17 and 18 may be turned to raise them into position, and said bolts are afterward employed in connection with other bolts, as shown in Figs. 2 and 3, for rigidly holding the sections together. A strut 63, having forked ends 64, is engaged by the cross-brace on the section 16 of the mast, said brace being indicated at 65 in Fig. 1ª. This strut is projected out horizontally from the rear of the machine and has a cross-pin 66 in its free end.

67 (see Fig. 1) represents a rod or rope which is engaged with the outer section 18 of the mast and passed to the outer end of the strut 63. To this end of the strut a suitable tackle 68 is connected, said tackle being also connected with any suitable part of the base—as, for example, the beam 69, arranged as shown in Fig. 1. The fall of the tackle 68 is run over the bull-drum, and by this means the mast may be raised from the position shown by dotted lines in Fig. 1 to its operative position, as indicated by full lines. When in proper position, the bolts are fastened together, and the mast is thus rendered rigid. After this operation has been performed the strut 63 should be removed and the mast strengthened by guy-lines suitably arranged. The operator stands at the front of the machine alongside of the mast, (left hand of Fig. 1,) and by manipulating various levers 39, 48, and 58 the operation of the apparatus may be accurately controlled. After the lines and drill have been properly connected it is only necessary for the operator to handle these levers, and by such means the entire machine is placed under the control of a single man.

Various changes in the form, proportions, and minor details of my invention may be resorted to without departing from the spirit and scope thereof. Hence I consider myself entitled to all such variations as may lie within the scope of my claims.

Having thus described my invention, I claim as new and desire to secure by Letters Patent—

1. In a well-drilling apparatus, the combination with the framing, of a drive-shaft mounted therein, a driving-gear attached to the shaft, a bull-drum, a lever in which one end of the bull-drum is mounted, means for swinging the lever, a bull-wheel in connection with the bull-drum and adapted to be moved therewith to engage or disengage the drive-wheel, a sand-reel, a standard, a box arranged to swing on the standard and having one end of the axis of the sand-reel mounted therein, a gear in connection with the sand-reel, a lever carrying the other end of the axis of the sand-reel, means for operating the lever to throw the gear of the sand-reel into or out of engagement with the said driving-gear, and a brake-block arranged at the side of the sand-reel gear opposite the driving-wheel, to be engaged by the sand-reel gear as said gear disengages the driving-gear.

2. In a well-drilling apparatus, the combination with the frame and mast, of a drive-shaft mounted on the base of the frame, a walking-beam mounted on the mast, a cranked connection between the walking-beam and the drive-shaft, a driving-gear mounted on the drive-shaft, a bull-drum arranged at one side of the driving-gear, a bull-wheel connected and moving with the bull-drum, a lever on which one end of the bull-drum is mounted, means for swinging the lever, said means extending to one side of the frame, a sand-reel, a box supported on the frame and arranged to turn, in which box one end of the axis of the sand-reel is mounted, a lever carrying the other end of the axis of the sand-reel, a gear in connection with the sand-reel and adapted to engage the driving-gear, means for operating the second lever, said means also being connected to one side of the frame, and a brake-block arranged at the side of the sand-reel gear opposite the driving-gear.

In testimony whereof I have signed my name to this specification in the presence of two subscribing witnesses.

CLYDE SELWYN WRIGHT.

Witnesses:
  ALEXANDER COCHRAN,
  CARL G. WRIGHT.